(12) United States Patent
Kudo et al.

(10) Patent No.: US 12,057,246 B2
(45) Date of Patent: Aug. 6, 2024

(54) WIRING MEMBER TO BE FIXED TO ADHEREND BY DOUBLE-SIDED ADHESIVE MEMBER

(71) Applicant: Sumitomo Wiring Systems, Ltd., Mie (JP)

(72) Inventors: Ryusuke Kudo, Mie (JP); Tetsuya Nishimura, Mie (JP); Haruka Nakano, Mie (JP); Masaki Mizushita, Mie (JP); Kenta Arai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 152 days.

(21) Appl. No.: 17/774,750

(22) PCT Filed: Oct. 28, 2020

(86) PCT No.: PCT/JP2020/040381
§ 371 (c)(1),
(2) Date: May 5, 2022

(87) PCT Pub. No.: WO2021/095525
PCT Pub. Date: May 20, 2021

(65) Prior Publication Data
US 2022/0375646 A1  Nov. 24, 2022

(30) Foreign Application Priority Data
Nov. 14, 2019  (JP) .................. 2019-206194

(51) Int. Cl.
*H01B 7/08* (2006.01)
*H01B 7/40* (2006.01)
*B60R 16/02* (2006.01)

(52) U.S. Cl.
CPC ................. *H01B 7/08* (2013.01); *H01B 7/40* (2013.01); *B60R 16/0207* (2013.01)

(58) Field of Classification Search
CPC ........ H01B 7/08; H01B 7/40; B60R 16/0207; B60R 16/0215
(Continued)

(56) References Cited

U.S. PATENT DOCUMENTS 8,203,078 B1 * 6/2012 Fulco ................... H02G 3/0431
174/68.3
9,343,885 B2 * 5/2016 Larson ................... H02G 3/305
(Continued)

FOREIGN PATENT DOCUMENTS

| JP | 2002-112440 | 4/2002 |
|---|---|---|
| JP | 2002-208325 | 7/2002 |

(Continued)

OTHER PUBLICATIONS

International Search Report issued in International Patent Application No. PCT/JP2020/040381, dated Dec. 28, 2020, along with an English translation thereof.
(Continued)

*Primary Examiner* — Timothy J Thompson
*Assistant Examiner* — Michael F McAllister
(74) *Attorney, Agent, or Firm* — GREENBLUM & BERNSTEIN, P.L.C.

(57) ABSTRACT

A wiring member includes: a wire-like transmission member; a fixing sheet having one main surface to which the wire-like transmission member is fixed; an intervention sheet fixed to the fixing sheet and having a first contact surface; and a double-sided adhesive member attached to the first contact surface, wherein when a surface of the fixing sheet having contact with the intervention sheet is a second contact surface, adhesive force between the first contact surface and the double-sided adhesive member is larger than adhesive force between the second contact surface and the double-sided adhesive member.

9 Claims, 5 Drawing Sheets

(58) Field of Classification Search
USPC .......................................................... 174/68.1
See application file for complete search history.

(56) References Cited

U.S. PATENT DOCUMENTS

| | | | | |
|---|---|---|---|---|
| 9,640,958 | B2* | 5/2017 | Dower | H02G 3/266 |
| 2009/0223025 | A1* | 9/2009 | Cyrluk | B60P 7/0869 |
| | | | | 24/130 |
| 2019/0392963 | A1 | 12/2019 | Ishida et al. | |
| 2020/0070749 | A1 | 3/2020 | Mizuno et al. | |
| 2022/0139594 | A1 | 5/2022 | Nakano et al. | |

FOREIGN PATENT DOCUMENTS

| | | |
|---|---|---|
| JP | 2018-137208 | 8/2018 |
| JP | 6579297 | 9/2019 |
| WO | 2014/038259 | 3/2014 |
| WO | 2018/207641 | 11/2018 |

OTHER PUBLICATIONS

China Office Action issued in China Patent Application No. 202080077763.X, dated Mar. 30, 2024, together with English translation thereof.

* cited by examiner

WIRING MEMBER TO BE FIXED TO ADHEREND BY DOUBLE-SIDED ADHESIVE MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

There is a case where the wire harness described in Patent Document 1 is desired to be attached and fixed to an adherend by a double-sided adhesive member.

Accordingly, an object is to provide a technique capable of favorably attaching and fixing a wiring member to an adherend by a double-sided adhesive member.

Means to Solve the Problem

A wiring member according to the present disclosure is a wiring member including: at least one wire-like transmission member; a fixing sheet having one main surface to which the wire-like transmission member is fixed; at least one intervention sheet fixed to the fixing sheet and having a first contact surface; and a double-sided adhesive member attached to the first contact surface, wherein when a surface of the fixing sheet having contact with the intervention sheet is a second contact surface, adhesive force between the first contact surface and the double-sided adhesive member is larger than adhesive force between the second contact surface and the double-sided adhesive member.

Effects of the Invention

According to the present disclosure, a wiring member can be favorably attached and fixed to an adherend by a double-sided adhesive member.

DESCRIPTION OF EMBODIMENT(S)

Figure 1:
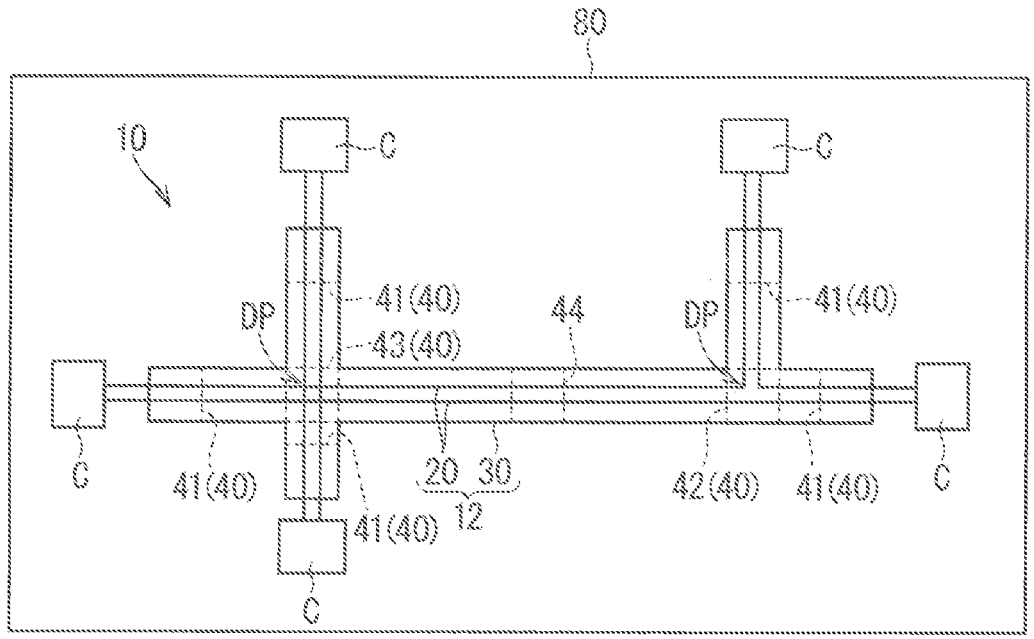
FIG. 1 is a schematic plan view illustrating a wiring member according to an embodiment.

[Description of embodiment of present disclosure] Embodiments of the present disclosure are listed and described firstly.

A wiring member according to the present disclosure is as follows.

(1) A wiring member includes: at least one wire-like transmission member; a fixing sheet having one main surface to which the wire-like transmission member is fixed; at least one intervention sheet fixed to the fixing sheet and having a first contact surface; and a double-sided adhesive member attached to the first contact surface, wherein when a surface of the fixing sheet having contact with the intervention sheet is a second contact surface, adhesive force between the first contact surface and the double-sided adhesive member is larger than adhesive force between the second contact surface and the double-sided adhesive member. Accordingly, when the wiring member is attached and fixed to the adherend by the double-sided adhesive member, the double-sided adhesive member is provided on the intervention sheet, thus fixing strength gets higher compared with a case where the double-sided adhesive member is provided on the fixing sheet.

(2) The intervention sheet may be fixed to another main surface of the fixing sheet on a side opposite to the one main surface of the fixing sheet to which the wire-like transmission member is fixed. Accordingly, the other main surface of the fixing sheet is rigidly fixed to the adherend via the double-sided adhesive member and the intervention sheet.

(3) It is also applicable that the first contact surface is a surface of a resin layer having an evenly-filled cross-sectional surface, and the second contact surface is a surface of a fibrous material layer. An effective contact area of the first contact surface having contact with the double-sided adhesive member is larger than an effective contact area of the second contact surface having contact with the double-sided adhesive member. Accordingly, easily obtained is a configuration that the adhesive force between the first contact surface and the double-sided adhesive member is larger than that between the second contact surface and the double-sided adhesive member.

(4) It is also applicable that the fixing sheet includes a first layer and a second layer stacked on each other, the first layer is a fixing layer fixing the wire-like transmission member, the second layer is the fibrous material layer, and the intervention sheet is fixed to the second layer. A necessary function other than fixation of the wire-like transmission member in the fixing sheet can be added to the second layer. Even in this case, the intervention sheet is fixed to the second layer, thus a side of the second layer in the fixed sheet can be fixed to the adherend.

(5) The intervention sheet and the fixing sheet may be fused to each other. Accordingly, the intervention sheet and the fixing sheet are rigidly fixed to each other.

(6) The intervention sheet may be provided along a longitudinal direction of a part of the fixing sheet. Accordingly, increase in weight of the wiring member caused by providing the intervention sheet is suppressed.

(7) It is also applicable that the plurality of intervention sheets are provided, and the plurality of intervention sheets include a plurality of partial sheets provided at intervals along a longitudinal direction of the fixing sheet. Accordingly, the fixing sheet can be fixed to the adherend at a plurality of positions along the longitudinal direction of the fixing sheet while increase in weight of the wiring member caused by providing the intervention sheet is suppressed.

(8) It is also applicable that the plurality of wire-like transmission members are provided, a branch portion in which some of the wire-like transmission members in the plurality of wire-like transmission members are branched from another some of the wire-like transmission members are located on the fixing sheet, and the intervention sheet includes a portion covering the branch portion. Accordingly, the branch portion can be fixed to the adherend.

(9) The intervention sheet may have higher rigidity than the fixing sheet. Accordingly, a shape of the wiring member is held by the intervention sheet.

DETAILS OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
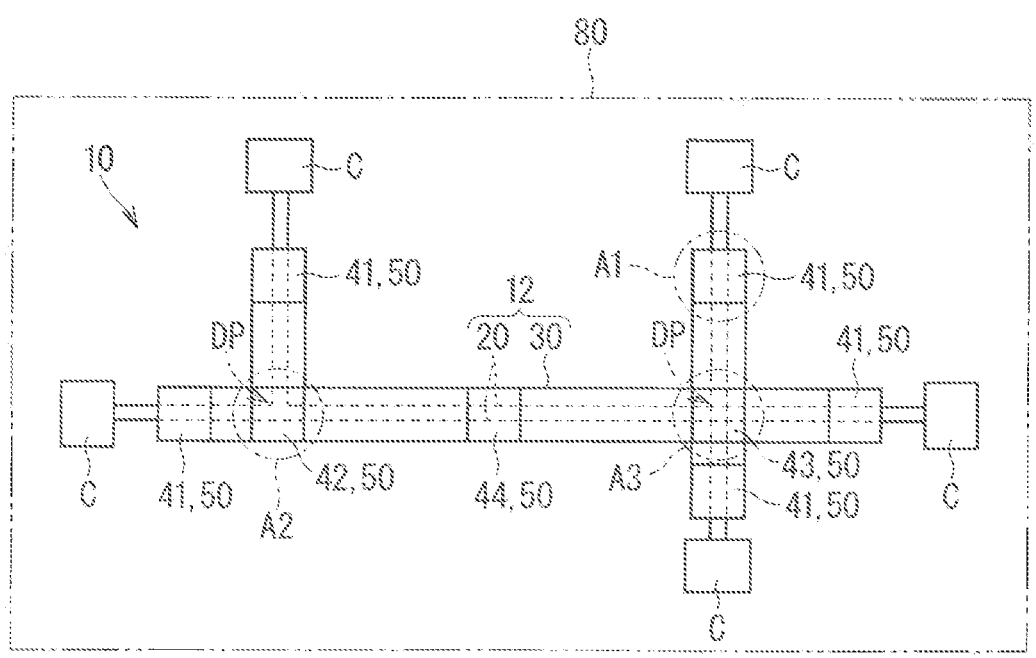
FIG. 2 is a schematic back view illustrating the wiring member according to the embodiment.
Figure 3:
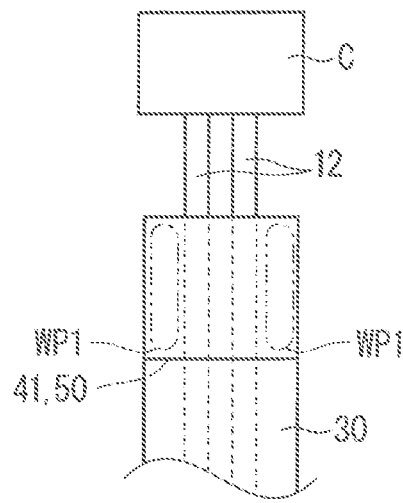
FIG. 3 is a schematic enlarged view of a region A1 in FIG. 2.
Figure 4:
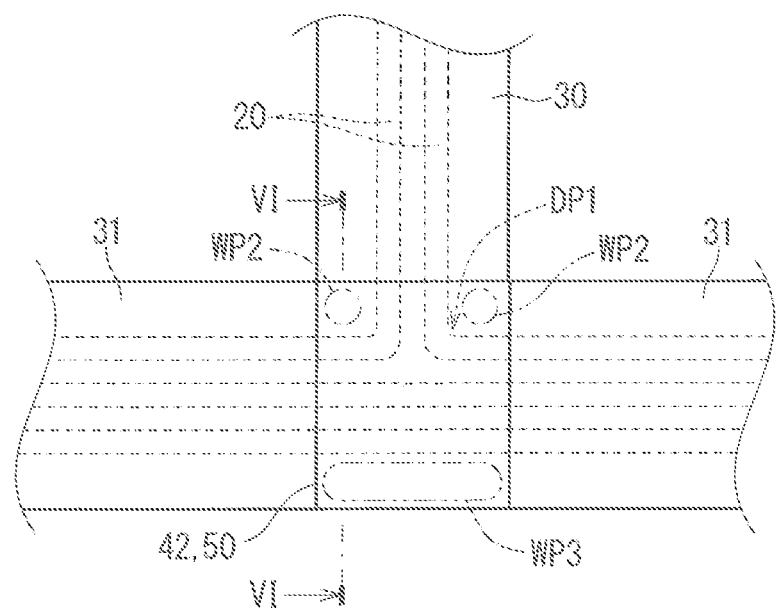
FIG. 4 is a schematic enlarged view of a region A2 in FIG. 2.
Figure 5:
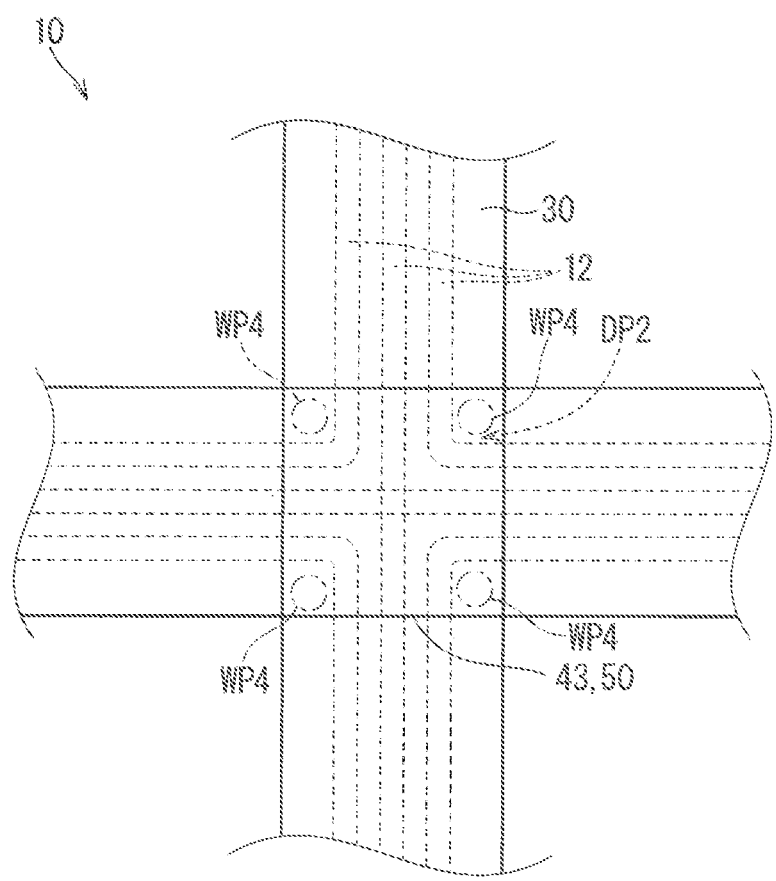
FIG. 5 is a schematic enlarged view of a region A3 in FIG. 2.
Figure 6:
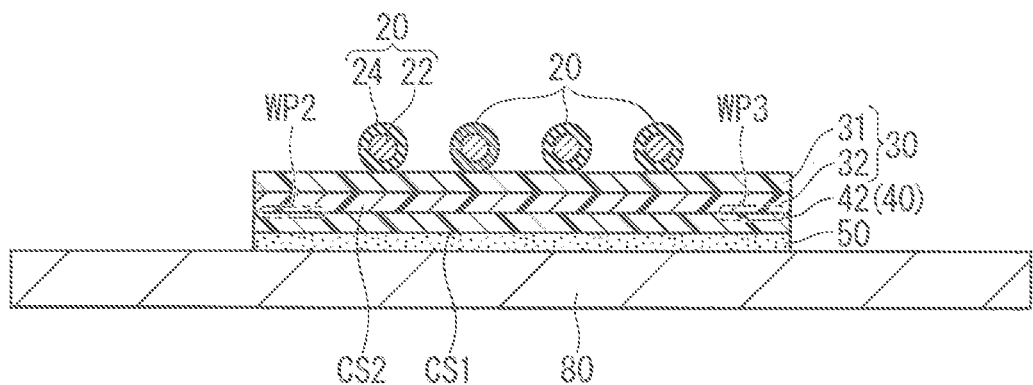
FIG. 6 is a schematic cross-sectional view along a VI-VI line in FIG. 4.

A wiring member according to an embodiment is described hereinafter. FIG. 1 is a schematic plan view illustrating a wiring member 10 according to the embodiment. FIG. 2 is a schematic back view illustrating the wiring member 10 according to the embodiment. FIG. 3 is a schematic enlarged view of a region A1 in FIG. 2. FIG. 4 is a schematic enlarged view of a region A2 in FIG. 2. FIG. 5 is a schematic enlarged view of a region A3 in FIG. 2. FIG. 6 is a schematic cross-sectional view along a VI-VI line in FIG. 4.

The wiring member 10 includes a wiring body 12, an intervention sheet 40, and a double-sided adhesive member 50. The wiring member 10 is attached to an adherend 80 by the double-sided adhesive member 50. The wiring member 10 is mounted to a vehicle, for example. The adherend 80 is a member to be fixed to the wiring member 10 in a vehicle. The adherend 80 is a body frame, a body panel, and an interior panel, for example.

The wiring body 12 includes a wire-like transmission member 20 and a fixing sheet 30 At least one wire-like transmission member 20 is included. Herein, the plurality of wire-like transmission members 20 are included. Each wire-like transmission member 20 is a wire-like member transmitting an electrical power or light, for example. The fixing sheet 30 is formed into a flat shape as a whole. The plurality of wire-like transmission members 20 are fixed to the fixing sheet 30, thus the wiring body 12 is kept in a flat state. In the example illustrated in FIG. 6, the plurality of wire-like transmission members 20 having the same diameter and structure are disposed on one fixing sheet 30. However, the diameter and the structure of each of the plurality of wire-like transmission members 20 may be appropriately set, thus the wire-like transmission members 20 each having a different diameter and a structure, for example, may be disposed on the same fixing sheet 30.

The plurality of wire-like transmission members 20 are assumed to be members connecting components in a vehicle. A connector C, for example, is provided on an end portion of the wire-like transmission member 20. This connector C is connected to a connector provided in the other side component, thus the wire-like transmission member 20 is connected to the other side component. That is to say, the present wiring member 10 is used as the wiring member 10 electrically connecting various types of component in a vehicle, for example (or connecting them so that they can perform optical communication). The connector C may be fixed to the fixing sheet 30.

Routes of the plurality of wire-like transmission members 20 are set in accordance with a position of a component to which the wire-like transmission members 20 are connected. The plurality of wire-like transmission members 20 are fixed to the fixing sheet 30, thus the plurality of wire-like transmission members 20 are kept in a form following a wiring route corresponding to a position of a component as a connection destination of each wire-like transmission member 20. The plurality of wire-like transmission members 20 may be fixed to the fixing sheet 30 in a state where a branch wire is branched from a main wire. The fixing sheet 30 may also be formed in a shape in which a portion to which the branch wire is fixed is branched from a portion to which the main wire is fixed. Herein, the plurality of wire-like transmission members 20 are branched on the fixing sheet 30. A portion where some of the wire-like transmission members 20 are branched from the other some of the wire-like transmission members 20 in the plurality of wire-like transmission members 20 are referred to as a branch portion DP. Herein, two branch portions DP1 and DP2 are located on the fixing sheet 30.

The wire-like transmission member 20 includes a transmission wire body 22 and a covering layer 24. The transmission wire body 22 transmits an electrical power or light, for example. The covering layer 24 covers the transmission wire body 22. For example, the wire-like transmission member 20 may be a general wire having a core wire and a covering layer around the core wire, or may also be a shielded wire, a twisted wire, an enamel wire, a nichrome wire, or an optical fiber.

The wire-like transmission member 20 transmitting the electrical power may be various kinds of signal lines or various kinds of power lines. Some of the wire-like transmission members 20 transmitting the electrical power may be used as an antenna or coil, for example, transmitting or receiving a signal or electrical power to or from a space.

The wire-like transmission member 20 may be a single wire-like object or a composite object of a plurality of wire-like objects (a twisted wire and a cable made up of a plurality of wire-like objects covered by a sheath).

The wire-like transmission member 20 is fixed to a main surface of the fixing sheet 30. A fixing structure of the wire-like transmission member 20 fixed to the fixing sheet 30 is not particularly limited as long as the wire-like transmission member 20 is fixed to the fixing sheet 30. Applicable as the fixing state are a contact area fixation and a non-contact area fixation, or both fixations may be used together. Herein, the contact area fixation indicates that a portion where the wire-like transmission member 20 and the fixing sheet 30 have contact with each other is stuck and fixed. The non-contact area fixation is a fixing state which is not the contact area fixation, and indicates that a sewing thread, a cover, or an adhesive tape presses the wire-like transmission member 20 toward the fixing sheet 30 or sandwiches the wire-like transmission member 20 and the fixing sheet 30 to keep them in a fixing state. In the description hereinafter, the wire-like transmission member 20 and the fixing sheet 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 20 and the fixing sheet 30 are indirectly stuck and fixed via an adhesive agent, a gluing agent, and a double-sided adhesive tape provided therebetween. The contact area direct fixation indicates that the wire-like transmission member 20 and the fixing sheet 30 are directly stuck and fixed without an intervention of the adhesive agent, for example, which is separately provided. Considered in the contact area direct fixation is that resin included in at least one of the wire-like transmission member 20 and the fixing sheet 30 is melted, thus the wire-like transmission member 20 and the fixing sheet 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the wire-like transmission member 20 and the fixing sheet 30 are in the state of the contact area direct fixation by these means. Specifically, when the state of the contact area direct fixation is formed by the ultrasonic welding, for example, the wire-like transmission member 20 and the fixing sheet 30 are in the state of the contact area direct fixation by the ultrasonic welding.

In the description hereinafter, the wire-like transmission member 20 and the fixing sheet 30 are in the state of the contact area direct fixation.

The fixing sheet 30 may have a single layer structure. When the fixing sheet 30 has the single layer structure, the one layer is a fixing layer to which the wire-like transmission member is fixed, and is a layer to which the intervention sheet is fixed. The fixing sheet 30 may be a resin sheet. For example, the fixing sheet 30 may be formed of resin such as polyvinyl chloride (PVC), polyethylene (PE), polypropylene (PP), or polyethylene terephthalate (PET). The fixing sheet 30 may be a sheet having an evenly filled cross-sectional surface. The fixing sheet 30 is also considered a fibrous material such as a braided cloth, a woven cloth, or a non-woven cloth, for example. The fixing sheet 30 is also considered a foam sheet, for example. The fixing sheet 30 may be a metal sheet.

The fixing sheet 30 may also have a multilayer structure. When the fixing sheet has the multilayer structure, various types of sheet described in the single layer structure described above is adopted to the sheet constituting the fixing layer. Various types of sheet described in the single layer structure described above and a sheet which is not suited for fixation of the wire-like transmission member may be adopted to the sheet which does not constituting the fixing layer.

Herein, the fixing sheet 30 includes a first layer 31 and a second layer 32 stacked on each other. The fixing sheet 30 has a double layer structure. The fixing sheet 30 does not include a layer other than the first layer 31 and the second layer 32. The fixing sheet 30 may have a three or more layer structure. The fixing sheet 30 may include a layer other than the first layer 31 and the second layer 32.

The first layer 31 is a fixing layer. Any layer is not particularly limited but can be used as the first layer 31 as long as it can fix the wire-like transmission member to the fixing sheet. For example, the first layer 31 may also be a resin layer evenly filled with resin and having an evenly filled cross-sectional surface. The wire-like transmission member 20 is fixed by the first layer 31. Resin as a material of the first layer 31 is the same as that of the covering layer 24, for example. One surface of the first layer 31 is one main surface of the fixing sheet 30.

The second layer 32 is a fibrous material layer. The intervention sheet 40 is fixed to the second layer 32. One surface of the second layer 32 is the other main surface of the fixing sheet 30.

The first layer 31 and the second layer 32 are fixed to each other while the other surface of the first layer 31 and the other surface of the second layer 32 have contact with each other. A fixing state of the first layer 31 and the second layer 32 is not particularly limited, however, fixing by fusion or adhesion is preferable. Particularly, the first layer 31 as a resin layer and the second layer 32 as a fibrous material layer are preferably fixed by resin of the resin layer or an adhesive agent penetrating between fibers in the fibrous material layer. Such a configuration causes so-called anchor effect, thus the first layer 31 and the second layer 32 are rigidly fixed. Herein, the first layer 31 and the second layer 32 are fused to each other. That is to say, the resin of the first layer 31 as the resin layer in a fluent state penetrates between the fibers of the second layer 32 as the fibrous material layer, and then hardened. Maintained accordingly is a state where the resin of the resin layer penetrates between the fibers of the fibrous material layer, and the first layer 31 and the second layer 32 are fixed to each other. The first layer 31 and the second layer 32 are formed to have the same size. One of the first layer 31 and the second layer 32 may also be formed to be larger than the other one thereof. The first layer 31 and the second layer 32 are wholly fixed at a region where they have contact with each other. The first layer 31 and the second layer 32 may also be fixed only at a part of a region where they have contact with each other.

The fixing sheet 30 may be a flexible member. For example, the first layer 31 is a resin layer having an evenly filled cross-sectional surface made up of flexible resin such as flexible PVC as a material, the second layer 32 is a non-woven cloth made up of PET as a material, and the fixing sheet 30 is a flexible member. For example, the fixing sheet 30 may have a plastic property so as to be able to follow bending of the wire-like transmission member 20. That is to say, it is also applicable that the wiring body 12 can be bent in a thickness direction (bending so that a fold line follows the main surface of the fixing sheet 30).

Each of the plurality of wire-like transmission members 20 may be fixed to the fixing sheet 30 at a plurality of positions at intervals along the longitudinal direction. Each of the plurality of wire-like transmission members 20 may be wholly fixed to the fixing sheet 30 continuously along the longitudinal direction.

The intervention sheet 40 covers the wiring body 12. The intervention sheet 40 covers the other main surface of the fixing sheet 30. The intervention sheet 40 is fixed to the fixing sheet 30. The intervention sheet 40 is fixed to a portion of the fixing sheet 30 away from a portion where the wire-like transmission member 20 is fixed. Herein, the intervention sheet 40 is fixed to the other main surface of the fixing sheet 30.

The intervention sheet 40 may be wholly or partially overlapped with the fixing sheet 30. The intervention sheet 40 may be formed of the same material as that of the fixing sheet 30, may also be formed of a different material. The intervention sheet 40 may be a resin sheet. For example, the intervention sheet 40 may be formed by resin such as PVC, PE, PP, or PET in the manner similar to the fixing sheet 30.

One of the fixing sheet 30 and the intervention sheet 40 may have higher rigidity than the other one thereof. Herein, the intervention sheet 40 is formed to have higher rigidity than the fixing sheet 30. For example, the intervention sheet 40 is formed of a rigid resin material such as hard PVC, nylon, PET, and PP to have an evenly filled cross-sectional surface. It is also applicable that the intervention sheet 40 can regulate bending of the wiring body 12. Described herein is that the intervention sheet 40 has a single layer structure made up of one resin layer. The resin layer has higher rigidity than the fixing sheet 30. The intervention sheet 40 may have a multilayer structure.

The intervention sheet 40 and the fixing sheet 30 are fixed to each other while a surface of the resin layer of the intervention sheet 40 and a surface of the fibrous material layer of the fixing sheet 30 have contact with each other. A fixing state of the intervention sheet 40 and the fixing sheet 30 is not particularly limited, however, fixing by fusion or adhesion is preferable. The intervention sheet 40 and the fixing sheet 30 are fused to each other herein. For example, the following three states are examples of fixing the intervention sheet 40 and the fixing sheet 30 by fusion. The intervention sheet 40 and the fixing sheet 30 may have a fusion state according to any state in the following three states, and it is preferable that at least one of the intervention sheet 40 and the fixing sheet 30 is melted so that the intervention sheet 40 and the fixing sheet 30 can be mutually fixed.

A first state is as follows. That is to say, in the resin layer of the intervention sheet 40 and the fibrous material layer of the fixing sheet 30, the resin of the resin layer of the intervention sheet 40 is heated and melted by the ultrasonic welding, for example, to have contact with the fixing sheet 30 and stuck thereto, and the intervention sheet 40 and the fixing sheet 30 are fused to each other. At this time, it is also applicable that the resin of the resin layer in the intervention sheet 40 has contact with only the surface of the fibrous material layer or penetrates inside the fibrous material layer. When the resin of the resin layer in the intervention sheet 40 penetrates between the fibers in the fibrous material layer and is fixed thereto, such a configuration causes so-called anchor effect, thus the intervention sheet 40 and the fixing sheet 30 are rigidly fixed. That is to say, the resin of the resin layer in the intervention sheet 40 in a fluent state penetrates between the fibers of the fibrous material layer in the fixing sheet 30, and is then hardened. Maintained accordingly is a state where the resin of the resin layer in the intervention sheet 40 penetrates between the fibers of the fibrous material layer in the fixing sheet 30, and the intervention sheet 40 and the fixing sheet 30 are fixed to each other.

A second state is as follows. That is to say, the resin of the fixing layer in the fixing sheet 30 is melted and penetrates the fibrous material layer. Then, the resin of the fixing layer penetrating the fibrous material layer has contact with the surface of the intervention sheet 40 and is stuck thereto, thus the intervention sheet 40 and the fixing sheet 30 are fused to each other.

A third state is as follows. That is to say, the resin constituting the intervention sheet 40 is melted and penetrates the fibrous material layer in the fixing sheet 30. The resin of the fixing layer in the fixing sheet 30 is also melted and penetrates the fibrous material layer. Then, the resin of the intervention sheet 40 in the fibrous material layer and the resin of the fixing sheet 30 have contact and are stuck to each other, thus the intervention sheet 40 and the fixing sheet 30 are fused to each other. In the third embodiment, the resin constituting the intervention sheet 40 penetrates the fibrous material layer in the fixing sheet 30, thus such a configuration causes so-called anchor effect, and the intervention sheet 40 and the fixing sheet 30 are rigidly fixed.

When the intervention sheet 40 and fixing sheet 30 are fixed by adhesion, an adhesive agent has contact with the intervention sheet 40 and the fixing sheet 30 and is stuck thereto. At this time, the adhesive agent may be stuck only to the surface of the fibrous material layer or penetrate inside the fibrous material layer. When the adhesive agent penetrates inside the fibrous material layer, such a configuration causes so-called anchor effect. Accordingly, the intervention sheet 40 and the fixing sheet 30 are rigidly fixed to each other via the adhesive agent.

The intervention sheet 40 is partially provided along a longitudinal direction of the fixing sheet 30. The intervention sheet 40 includes a plurality of partial sheets 41, 42, 43, and 44. Each of the partial sheets 41, 42, 43, and 44 covers only a part of the fixing sheet 30 along the longitudinal direction. Each of the partial sheets 41, 42, 43, and 44 is provided at intervals along the longitudinal direction of the fixing sheet 30. The intervention sheet 40 includes a portion covering the branch portions DP1 and DP2. Herein, the partial sheets 42 and 43 cover the branch portions DP1 and DP2.

Each of the partial sheets 41, 42, 43, and 44 is formed into a rectangular shape, however, a concave polygonal shape, a circular shape, or an oval shape, for example, are also applicable. Each of the partial sheets 41, 42, 43, and 44 includes a region covering the fixing sheet 30 different from each other. The partial sheet 41 is provided in an end portion of the fixing sheet 30. The partial sheets 42 and 43 are intermediate portions of the fixing sheet 30, and are provided in the branch portions DP1 and DP2. The partial sheet 44 is an intermediate portion of the fixing sheet 30, and is provided in a portion other than the branch portions DP1 and DP2.

The partial sheet 41 is provided in all of the plurality of (five herein) end portions in the fixing sheet 30 herein. The partial sheet 431 needs not be provided in all of the plurality of end portions in the fixing sheet 30. The partial sheet 41 may be provided only in some end portions in the plurality of end portions in the fixing sheet 30. The state where the partial sheet 41 is provided in the end portion of the fixing sheet 30 herein indicates that one of an end edge of the partial sheet 41 and an end edge of the fixing sheet 30 is located within 20 mm from the other one thereof along the longitudinal direction.

The partial sheet 41 is fused to the fixing sheet 30 on a lateral side of the wire-like transmission member 20, for example. The partial sheet 41 and the fixing sheet 30 are fused at two positions. Two fusion positions WP1 where the partial sheet 41 and the fixing sheet 30 are fused to each other are located on both lateral sides of the wire-like transmission member 20. Two fusion positions WP1 where the partial sheet 41 and the fixing sheet 30 are fused to each other are located in both side edge portions of the fixing sheet 30.

The partial sheet 42 is provided in the branch portion DP1. The branch portion DP1 is a portion where the plurality of wire-like transmission members 20 are branched into three portions. Three branch wires extend from a branch point in the branch portion DP1. Two branch wires in the three branch wires mutually extend in opposite positions, and the remaining one branch wire extends in a direction intersecting with the directions in which the two branch wires extend. It can also be considered that the branch wire is branched from the main wire extending along one direction in the branch portion DP1. The main wire and the branch wire are perpendicular to each other. An angle between the main wire and the branch wire may not be a right angle.

The partial sheet 42 is fused to the fixing sheet 30 on a lateral side of the wire-like transmission member 20, for example. The partial sheet 42 and the fixing sheet 30 are fused at three positions. Three fusion positions WP2 and WP3 where the partial sheet 42 and the fixing sheet 30 are fused to each other are located in positions surrounding the branch portion DP1. As illustrated in FIG. 4, one fusion position WP3 on one lateral side of the main wire (a side where the branch wire does not extend) may be larger than the two fusion positions WP2 on both lateral sides of the branch wire.

The partial sheet 43 is provided in the branch portion DP2. The branch portion DP2 is a portion where the plurality of wire-like transmission members 20 are branched into four portions. Four branch wires extend from a branch point in the branch portion DP2. In the four branch wires, two branch wires continuously formed around the branch point are perpendicular to each other. An angle between the two branch wires continuously formed around the branch point may not be a right angle.

The partial sheet 43 is fused to the fixing sheet 30 at a position sandwiched between two branch wires continuously formed around the branch point, that is to say, a position corresponding to a crotch portion of the two branch wires continuously formed around the branch point. The partial sheet 43 is fused to the fixing sheet 30 in positions of four crotch portions. The four fusion positions WP4 where the partial sheet 43 and the fixing sheet 30 are fused to each other are located in positions surrounding the branch portion DP2.

The partial sheet 44 is provided in an intermediate portion of the fixing sheet 30 extending along one direction. The partial sheet 44 is fused to the fixing sheet 30 on a lateral side of the wire-like transmission member 20 in the manner similar to the partial sheet 41.

The double-sided adhesive member 50 is attached to the intervention sheet 40. The double-sided adhesive member 50 includes two surfaces, both of which are formed into a sheet-like shape having an adhesive property. The double-sided adhesive member 50 is a member having an adhesive property in a portion having contact with the intervention sheet 40 and also having an adhesive property in an opposite portion thereof. The double-sided adhesive member 50 adheres to an outer surface of the intervention sheet 40 (a surface on a side opposite to a surface fixed to the wiring body 12) and planarly extends. An outer surface of the double-sided adhesive member 50 adheres to the adherend 80. An adhesive member may be provided on both surfaces of a base material sheet in the double-sided adhesive member 50. The double-sided adhesive member 50 may not include a base material sheet.

A region where the double-sided adhesive member 50 is provided for the wiring body 12 is appropriately set. Herein, the double-sided adhesive member 50 is wholly provided an outer surface of each of the partial sheets 41, 42, 43, and 44. Accordingly, the double-sided adhesive member 50 is formed into a rectangular shape to conform to an outer surface shape of each of the partial sheets 41, 42, 43, and 44. The double-sided adhesive member 50 may have a concave polygonal shape, a circular shape, or an oval shape, for example. The double-sided adhesive member 50 may also be formed into a shape different from the outer surface shape of each of the partial sheets 41, 42, 43, and 44. For example, the double-sided adhesive member 50 may be provided to have a frame-like shape following an outer edge of each of the partial sheets 41, 42, 43, and 44. When the intervention sheet 40 is a large sheet such as the fixing sheet 30, the double-sided adhesive member 50 is preferably provided in a part of the intervention sheet 40.

A surface of the intervention sheet 40 having contact with the double-sided adhesive member 50 is referred to as a first contact surface CS1. A surface of the fixing sheet 30 having contact with the intervention sheet 40 is referred to as a second contact surface CS2. Adhesive force between the first contact surface CS1 and the double-sided adhesive member 50 is larger than adhesive force between the second contact surface CS2 and the double-sided adhesive member 50 in a case where the double-sided adhesive member 50 is provided in the second contact surface CS2. The adhesive force can be evaluated using results separately tested in the same type of peeling test (for example, each test of JIS K6854), for example.

When only a part of the portion of the intervention sheet 40 covering the fixing sheet 30 is fixed to the fixing sheet 30, the double-sided adhesive member 50 is provided in a portion of the fixing sheet 30 which is covered by the intervention sheet 40 but is not fixed thereto to be able to measure the adhesive force between the second contact surface CS2 and the double-sided adhesive member 50. When the whole portion of the intervention sheet 40 covering the fixing sheet 30 is fixed to the fixing sheet 30, the portion of the fixing sheet 30 which is not covered by the intervention sheet 40 may also be considered the second contact surface CS2. That is to say, when the whole portion of the intervention sheet 40 covering the fixing sheet 30 is fixed to the fixing sheet 30, the double-sided adhesive member 50 is provided in a portion of the fixing sheet 30 which is not covered by the intervention sheet 40 to be able to measure the adhesive force between the second contact surface CS2 and the double-sided adhesive member 50.

As described above, the intervention sheet 40 has the single layer structure made up of the resin layer having the evenly filled cross-sectional surface. The intervention sheet 40 is fixed to the second layer 32 as the fibrous material layer in the fixing sheet 30 having the double layer structure made of the first layer 31 and the second layer 32. Thus, the first contact surface CS1 is a surface of the resin layer having the evenly filled cross-sectional surface. The second contact surface CS2 is a surface of the fibrous material layer. Accordingly, when the double-sided adhesive member 50 having the same size is provided in the first contact surface CS1 and the second contact surface CS2, an effective contact area of the first contact surface CS1 having contact with the double-sided adhesive member 50 is larger than an effective contact area of the second contact surface CS2 having contact with the double-sided adhesive member 50. Accordingly, easily obtained is a configuration that the adhesive force between the first contact surface CS1 and the double-sided adhesive member 50 is larger than that between the second contact surface CS2 and the double-sided adhesive member 50.

More specifically, the surface of the fibrous material layer has minute convex-concave portions caused by a flow of each of the plurality of fibers (for example, a gap between the fibers or bending of the fibers). When the double-sided adhesive member 50 is attached to the surface of the fibrous material layer, the double-sided adhesive member 50 has contact with convex portions and does not have contact with concave portions in the convex-concave portions. Thus, the effective contact area where the double-sided adhesive member 50 and the fibrous material layer have actually contact with each other is smaller than the size of the double-sided adhesive member 50. In the meanwhile, the surface of the resin layer having the evenly filled cross-sectional surface does not have convex-concave portions so much compared with the fibrous material layer. Thus, the effective contact area where the double-sided adhesive member 50 and the resin layer having the evenly filled cross-sectional surface have actually contact with each other is equal to or slightly smaller than the size of the double-sided adhesive member 50. Thus, the effective contact area of the first contact surface CS1 having contact with the double-sided adhesive member 50 is larger than the effective contact area of the second contact surface CS2 having contact with the double-sided adhesive member 50.

Figure 7:
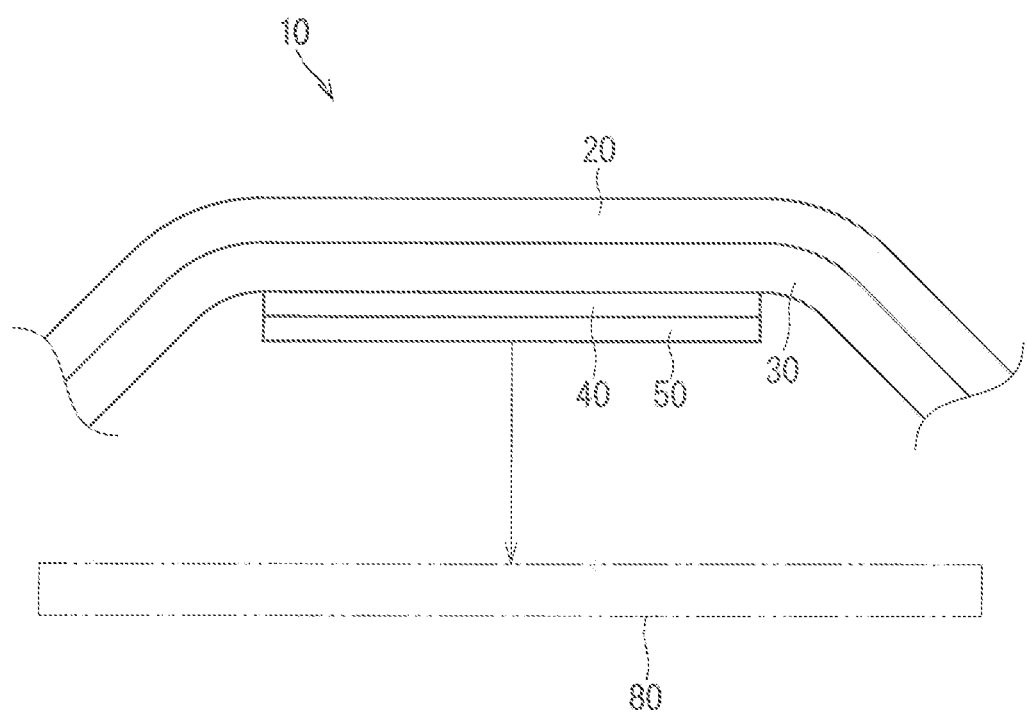
FIG. 7 is an explanation diagram illustrating the wiring member attached to an adherend.

FIG. 7 is an explanation diagram illustrating the wiring member 10 attached to the adherend 80.

Herein, the intervention sheet 40 has higher rigidity than the fixing sheet 30. Thus, suppressed is a deflection of the wiring member 10 caused by a self-weight in a portion where the intervention sheet 40 is provided, for example. Thus, the wiring member 10 is easily kept in a flat shape as illustrated in FIG. 7 in the portion where the intervention sheet 40 is provided. As a result, the double-sided adhesive member 50 is easily attached to the adherend 80.

According to the wiring member 10 having the above configuration, the double-sided adhesive member 50 is provided on the intervention sheet 40. Accordingly, fixing strength is higher in a case where the wiring member 10 is attached and fixed to the adherend 80 by the double-sided adhesive member 50 than in a case where the double-sided adhesive member 50 is provided on the fixing sheet 30.

The first contact surface CS1 is a surface of the resin layer having the evenly filled cross-sectional surface, and the second contact surface CS2 is a surface of the fibrous material layer. Accordingly, the effective contact area of the first contact surface CS1 having contact with the double-sided adhesive member 50 is larger than the effective contact area of the second contact surface CS2 having contact with the double-sided adhesive member 50. Accordingly, easily obtained is a configuration that the adhesive force between the first contact surface CS1 and the double-sided adhesive member 50 is larger than that between the second contact surface CS2 and the double-sided adhesive member 50.

Furthermore, there may be a case where the double-sided adhesive member 50 is detached at a time of a maintenance of the wiring member 10 or a time of being attached to the adherend 80 again. In a case where the double-sided adhesive member 50 is provided in the fibrous material layer, there is a possibility that a part of the fibrous material layer is damaged when the double-sided adhesive member 50 is detached from the fibrous material layer. In contrast, the double-sided adhesive member 50 is provided in the resin layer having the evenly filled cross-sectional surface herein, thus the double-sided adhesive member 50 is easily detached neatly when the double-sided adhesive member 50 is detached from the resin layer having the evenly filled cross-sectional surface, and damage hardly occurs in the resin layer. Accordingly, even when the double-sided adhesive member 50 is detached in the wiring member 10, the fixing sheet 30 and the intervention sheet 40 can be reused as they are.

The fixing sheet 30 includes the second layer 32 as the fibrous material layer, a necessary function other than fixation of the wire-like transmission member 20 in the fixing sheet 30 can be added to the second layer 32. Even in this case, the intervention sheet 40 is fixed to the second layer 32, thus a side of the second layer 32 in the fixing sheet 30 can be fixed to the adherend 80.

The intervention sheet 40 and the fixing sheet 30 are fused to each other, thus are rigidly fixed to each other.

The intervention sheet 40 is partially provided along the longitudinal direction of the fixing sheet 30, thus increase in weight of the wiring member 10 caused by providing the intervention sheet 40 is suppressed. The intervention sheet 40 includes the plurality of partial sheets 41, 42, 43, and 44 provided at intervals along the longitudinal direction of the fixing sheet 30. Accordingly, the fixing sheet 30 can be fixed to the adherend 80 at a plurality of positions along the longitudinal direction of the fixing sheet 30 while increase in weight of the wiring member 10 caused by providing the intervention sheet 40 is suppressed. The intervention sheet 40 includes a portion covering the branch portion DP, thus the branch portion DP can be fixed to the adherend 80.

The intervention sheet 40 has higher rigidity than the fixing sheet 30, thus the shape of the wiring member 10 is held by the intervention sheet 40. Accordingly, the portion of the wiring member 10 to which the intervention sheet 40 is fixed is easily kept in a planar shape. Accordingly, the double-sided adhesive member 50 is also easily kept in a planar shape, and the double-sided adhesive member 50 is easily attached to the adherend 80.

Figure 8:
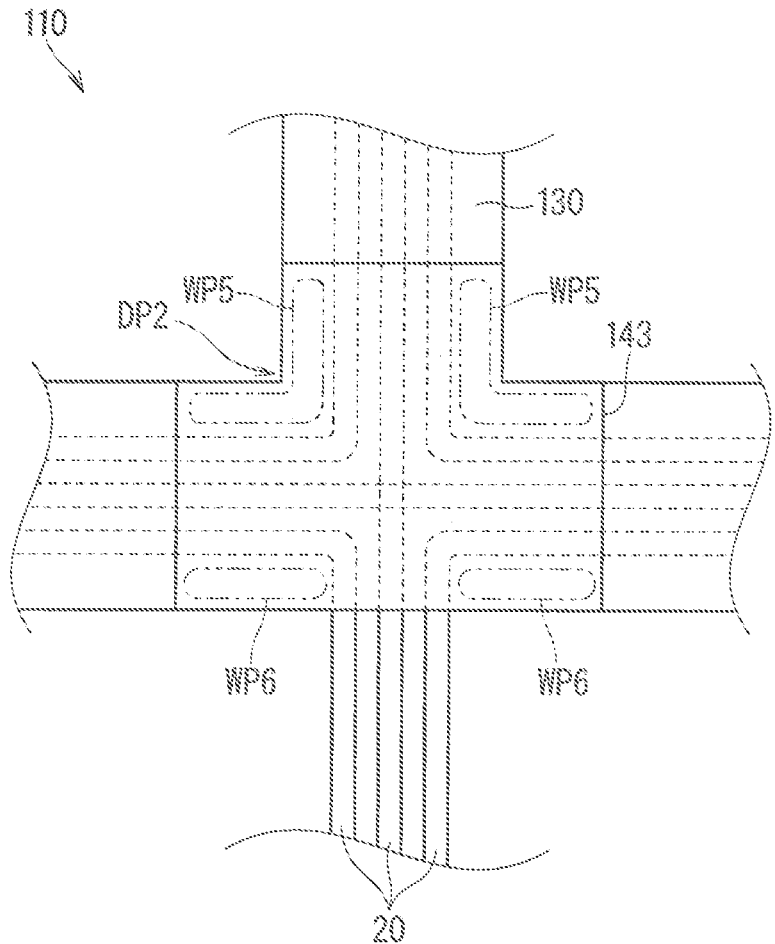
FIG. 8 is a back view illustrating a modification example of the wiring member.

[Modification example] FIG. 8 is a back view illustrating a modification example of the wiring member 10.

Shapes of a fixing sheet 130 and a partial sheet 143 in the branch portion DP2 are different in the wiring member 110 illustrated in FIG. 8.

The number of branches of the fixing sheet 130 in the branch portion DP2 is smaller than that of branches of the wire-like transmission member 20. The plurality of wire-like transmission members 20 are branched into four portions, and the fixing sheet 130 is branched into three portions. The fixing sheet 130 is not elongated in a direction of one branch wire. The one branch wire extends from a side edge of the fixing sheet 130 to an outer side of the fixing sheet 130. There may also be a case where the fixing sheet 130 is not branched in the branch portions DP1 and DP2.

The partial sheet 143 is branched in a direction in which the fixing sheet 130 is branched. Herein, the partial sheet 143 is branched into three portions. The partial sheet 143 is formed into a concave octagon shape with two re-entrant angles. The partial sheet 42 may be formed into a shape branched into three portions as with the partial sheet 143 in the branch portion DP1. The partial sheet 43 may be formed into a shape branched into four portions when the fixing sheet 130 is branched into four portions in the branch portion DP2 as with the fixing sheet 30.

The partial sheet 143 and the fixing sheet 130 are fused at four positions. Two fusion positions WP5 in four fusion positions WP5 and WP6 are provided in portions each having a re-entrant angle in the partial sheet 143. Each fusion position WP5 is provided to extend along two sides having the re-entrant angle. Each fusion position WP5 has an L-like shape. The remaining two fusion positions WP6 in four fusion positions WP5 and WP6 are elongated in one side. The fusion positions WP5 and WP6 are provided in a region larger than the fusion position WP4. Accordingly, fixing strength between the partial sheet 143 and the fixing sheet 130 is increased.

The double-sided adhesive member 50 may be wholly provided in the partial sheet 143. The double-sided adhesive member 50 may also be provided to have a rectangular shape in a portion including the branch point in the manner similar to FIG. 5.

Figure 9:
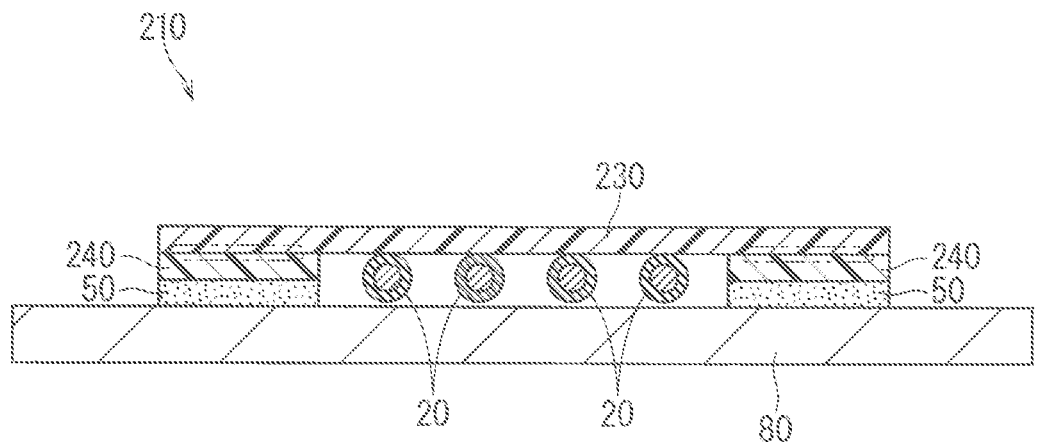
FIG. 9 is a schematic cross-sectional view illustrating another modification example of the wiring member.

FIG. 9 is a schematic cross-sectional view illustrating a modification example of the wiring member 10.

In the wiring member 210 illustrated in FIG. 9, an intervention sheet 240 is provided on a side of one main surface of a fixing sheet 230. The wiring member 210 is attached to the adherend 80 while one main surface of the fixing sheet 230 to which the wire-like transmission member 20 is fixed is directed to the adherend 80. In this case, one main surface of the fixing sheet 230 is considered a surface of a resin material layer such as a non-woven cloth.

In addition, in the description of the embodiment, the first contact surface CS1 is the surface of the resin layer having the evenly filled cross-sectional surface, and the second contact surface CS2 is the surface of the fibrous material layer, thus the adhesive force between the first contact surface CS1 and the double-sided adhesive member 50 is larger than that between the second contact surface CS2 and the double-sided adhesive member 50, however, this configuration is not necessary. The other combination may be applied to the first contact surface CS1 and the second contact surface CS2. For example, it is also applicable that both the first contact surface CS1 and the second contact surface CS2 are surfaces of resin layers each having an evenly filled cross-sectional surface and the first contact surface CS1 is formed more flatly than the second contact surface CS2. That is to say, the first contact surface CS1 may be formed to have less convex-concave portions (smaller surface roughness) in the surface than the second contact surface CS2. For example, applicable is a member that a material constituting the first contact surface CS1 has better compatibility with the double-sided adhesive member 50 than a material constituting the second contact surface CS2.

In the description of the embodiment, the plurality of partial sheets 41, 42, 43, and 44 are provided, however, this configuration is not necessary. The partial sheets 41, 42, 43, and 44 can be appropriately omitted or added. It is sufficient that at least one of the partial sheets 41, 42, 43, and 44 is provided.

In the description of the embodiment, the intervention sheet 40 has higher rigidity than the fixing sheet 30, however, this configuration is not necessary. The intervention sheet 40 may have the same or lower rigidity than the fixing sheet 30. For example, the intervention sheet 40 may be a film.

The wiring member 10 is also considered to be transported in a state where the double-sided adhesive member 50 does not adhere to the adherend 80. In this case, it is preferable that the wiring member 10 further includes a peeling member provided on the outer surface of the double-sided adhesive member 50 in a state before the double-sided adhesive member 50 adheres to the adherend 80.

The evenly filled cross-sectional surface may also be considered a shape in which at least the surface of the first contact surface has a little gap, for example. The state where the surface thereof has a little gap indicates that a gap formed in the surface made up of the first contact surface is smaller than the second contact surface.

Each configuration described in the embodiment and each modification example can be appropriately combined as long as they are not contradictory.

EXPLANATION OF REFERENCE SIGNS 10, 110, 210 wiring member
12 wiring body
20 wire-like transmission member
22 transmission wire body
24 covering layer
30, 130, 230 fixing sheet
31 first layer
32 second layer
40, 240 intervention sheet
41, 42, 43, 44, 143 partial sheet
50 double-sided adhesive member
80 adherend
C connector
CS1 first contact surface
CS2 second contact surface
WP1, WP2, WP3, WP4, WP5, WP6 fusion position
DP, DP1, DP2 branch portion

The invention claimed is:

1. A wiring member, comprising:
    at least one wire-like transmission member;
    a fixing sheet having one main surface to which the wire-like transmission member is fixed;
    at least one intervention sheet fixed to the fixing sheet and having a first contact surface; and
    a double-sided adhesive member attached to the first contact surface, wherein
    when a surface of the fixing sheet having contact with the intervention sheet is a second contact surface,
    adhesive force between the first contact surface and the double-sided adhesive member is larger than adhesive force between the second contact surface and the double-sided adhesive member.

2. The wiring member according to claim 1, wherein
    the intervention sheet is fixed to another main surface of the fixing sheet on a side opposite to the one main surface of the fixing sheet to which the wire-like transmission member is fixed.

3. The wiring member according to claim 1, wherein
    the first contact surface is a surface of a resin layer having an evenly-filled cross-sectional surface, and
    the second contact surface is a surface of a fibrous material layer.

4. The wiring member according to claim 3, wherein
    the fixing sheet includes a first layer and a second layer stacked on each other, the first layer is a fixing layer fixing the wire-like transmission member,
the second layer is the fibrous material layer, and
the intervention sheet is fixed to the second layer.

5. The wiring member according to claim 1, wherein the intervention sheet and the fixing sheet are fused to each other.

6. The wiring member according to claim 1, wherein the intervention sheet is provided along a longitudinal direction of a part of the fixing sheet.

7. The wiring member according to claim 6, wherein the plurality of intervention sheets are provided, and the plurality of intervention sheets include a plurality of partial sheets provided at intervals along a longitudinal direction of the fixing sheet.

8. The wiring member according to claim 1, wherein the plurality of wire-like transmission members are provided,
a branch portion in which some of the wire-like transmission members in the plurality of wire-like transmission members are branched from another some of the wire-like transmission members are located on the fixing sheet, and
the intervention sheet includes a portion covering the branch portion.

9. The wiring member according to claim 1, wherein the intervention sheet has higher rigidity than the fixing sheet.

\* \* \* \* \*